US008682141B2

(12) United States Patent
Ido et al.

(10) Patent No.: US 8,682,141 B2
(45) Date of Patent: Mar. 25, 2014

(54) VIDEO AND AUDIO RECORDING APPARATUS AND EDITING METHOD

(75) Inventors: Kazuo Ido, Kanagawa (JP); Takashi Furukawa, Kanagawa (JP); Motohiro Terao, Tokyo (JP); Tetsuya Makabe, Kanagawa (JP); Tadashi Fujiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 12/837,616

(22) Filed: Jul. 16, 2010

(65) Prior Publication Data

US 2011/0019972 A1 Jan. 27, 2011

(30) Foreign Application Priority Data

Jul. 23, 2009 (JP) ................ P2009-172386

(51) Int. Cl.
*H04N 5/761* (2006.01)

(52) U.S. Cl.
USPC .......................................... 386/278; 386/288

(58) Field of Classification Search
None
See application file for complete search history.

(56) References Cited

U.S. PATENT DOCUMENTS

| 2006/0098950 | A1 | 5/2006 | Naruse et al. | |
| 2006/0112124 | A1* | 5/2006 | Ando et al. | 707/101 |
| 2008/0051986 | A1* | 2/2008 | Amano et al. | 701/200 |
| 2009/0060459 | A1* | 3/2009 | Ishii et al. | 386/109 |
| 2009/0262617 | A1* | 10/2009 | Ai | 369/53.17 |
| 2010/0312807 | A1 | 12/2010 | Mitsuzumi et al. | |

FOREIGN PATENT DOCUMENTS

| EP | 0 929 072 | 7/1999 |
| EP | 1 353 508 | 10/2003 |
| JP | 11-136631 | 5/1999 |
| JP | 2006 140722 | 6/2006 |
| JP | 2008 53839 | 3/2008 |

* cited by examiner

*Primary Examiner* — Huy T Nguyen
*Assistant Examiner* — Eileen Adams
(74) *Attorney, Agent, or Firm* — Frommer Lawrence & Haug LLP; William S. Frommer

(57) ABSTRACT

A video and audio recording apparatus includes a recording medium that records base data therein and a control unit that starts and stops destructive editing in response to an instruction to start and stop destructive editing received through an operation unit. When part of the base data is deleted, the control unit writes, using management information for managing a physical area of the base data in the recording medium on the per predetermined recording unit basis, information indicating that the physical area in which the deleted part of the base data was recorded is defined as a reserved area on the per predetermined recording unit basis to the management information. When the edit data is input in response to the instruction to start editing, the edit data is overwritten into the physical area managed using the management information and defined as a reserved area on a preferential basis.

4 Claims, 10 Drawing Sheets

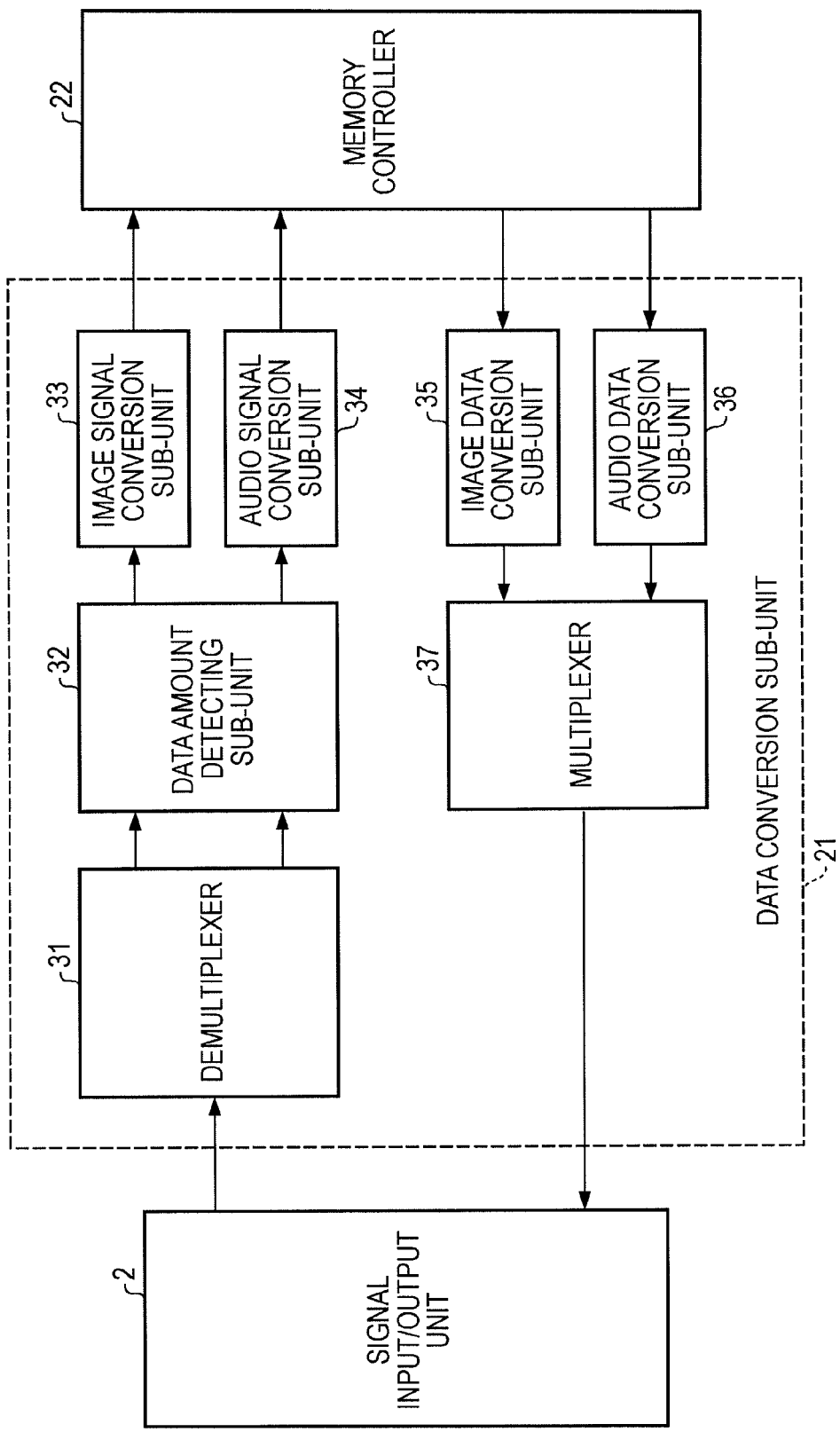

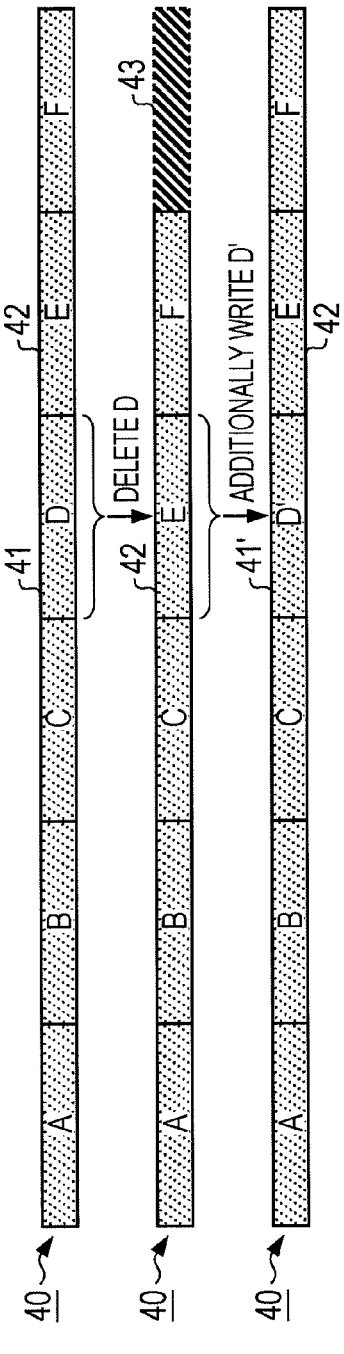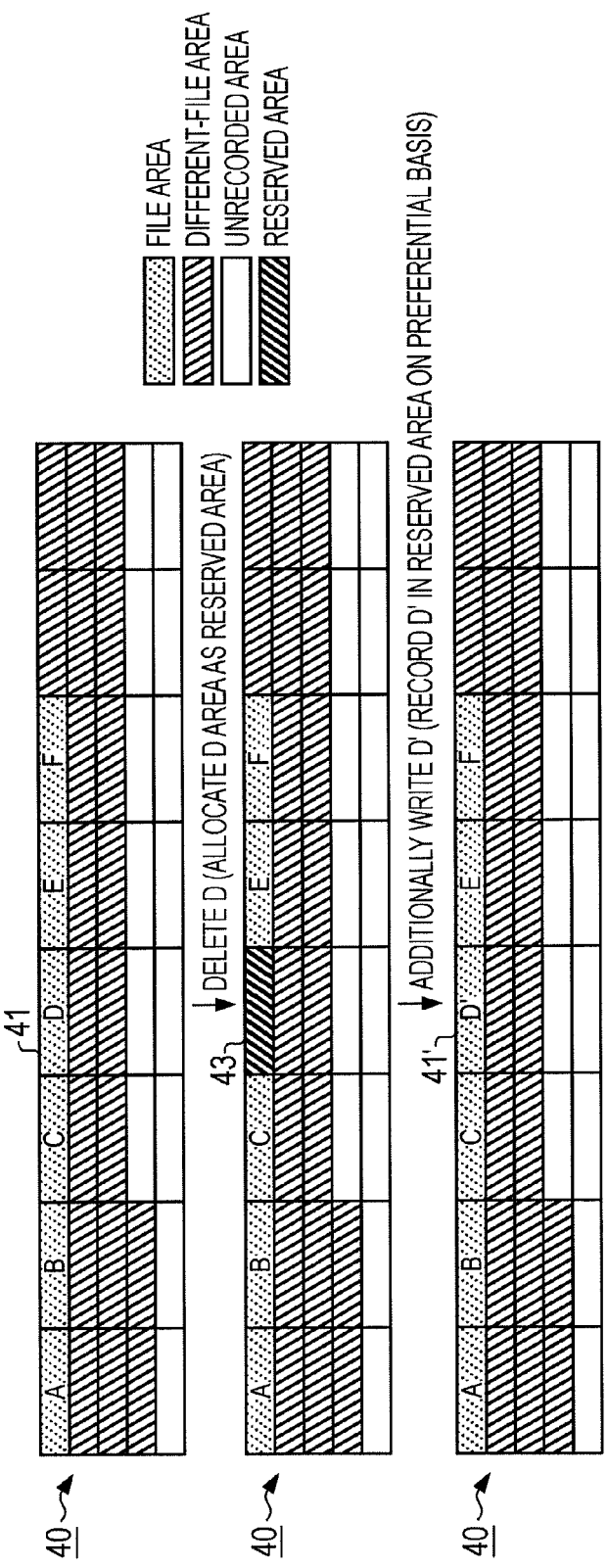
FIG. 4A
FIG. 4B

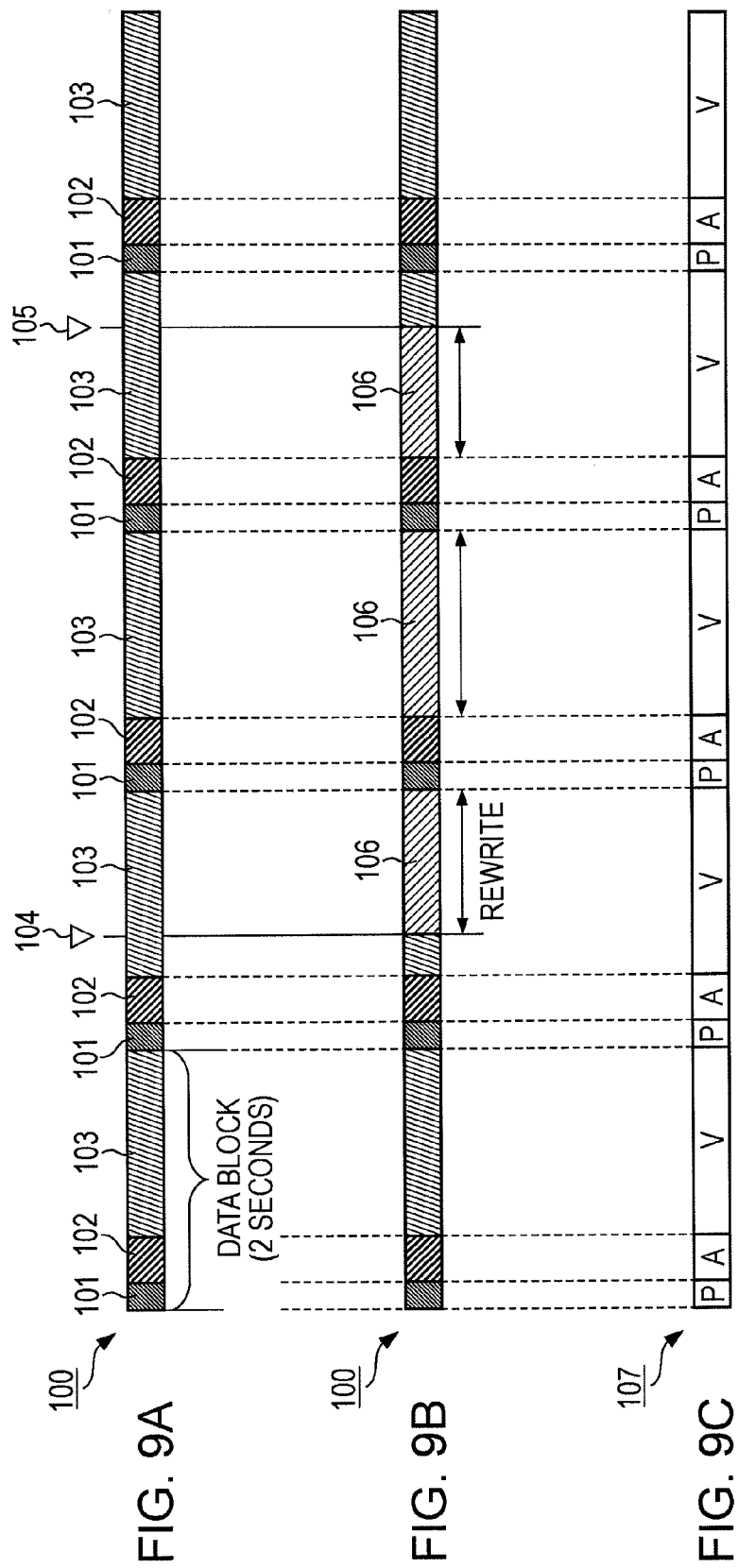

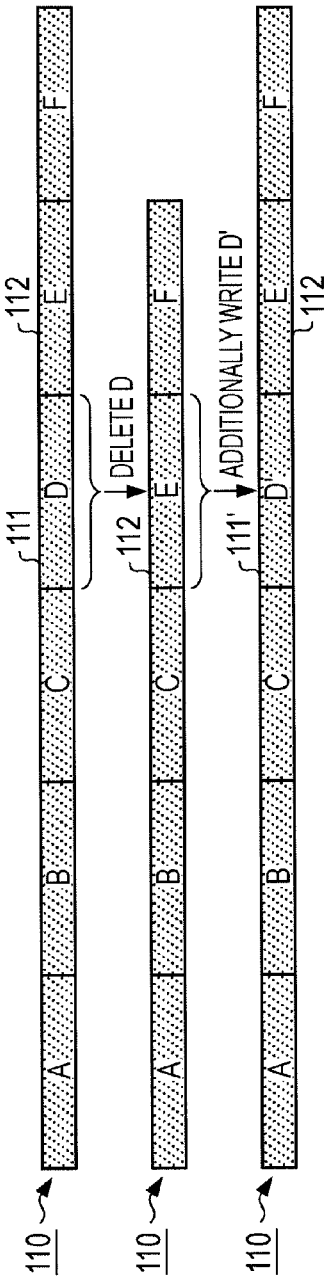
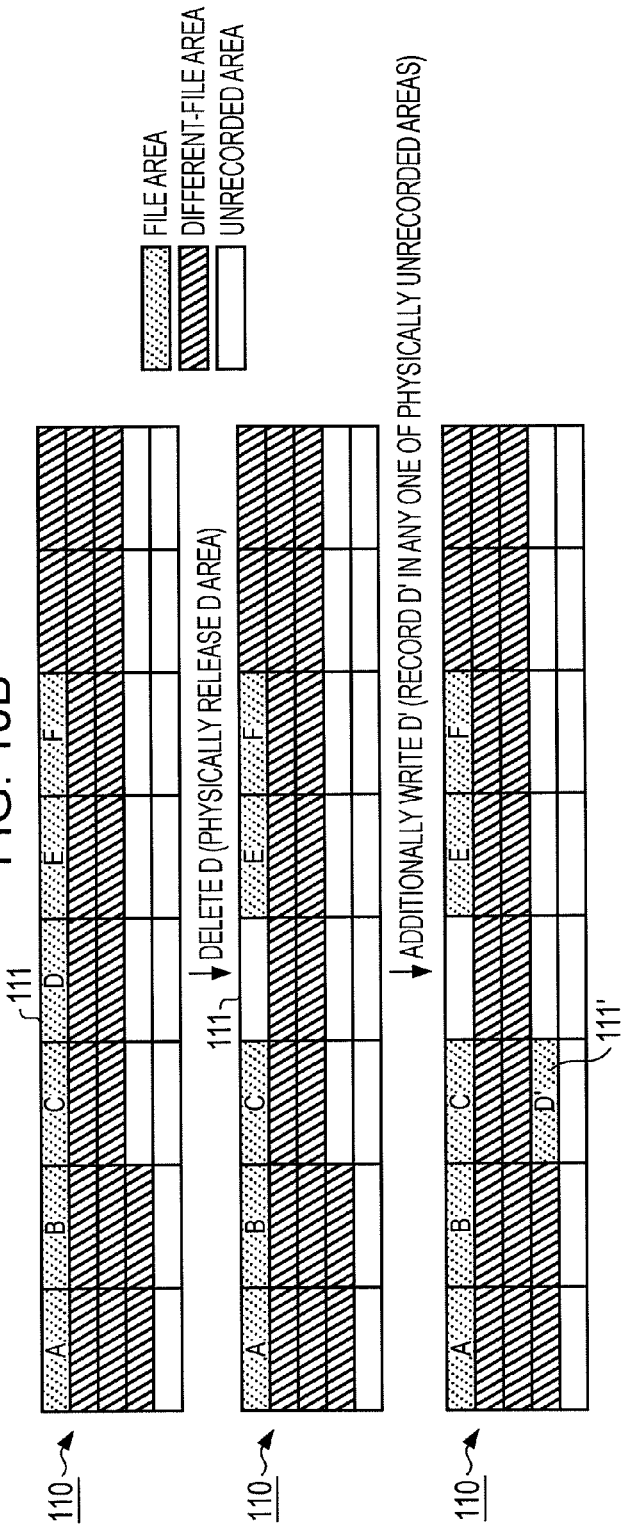

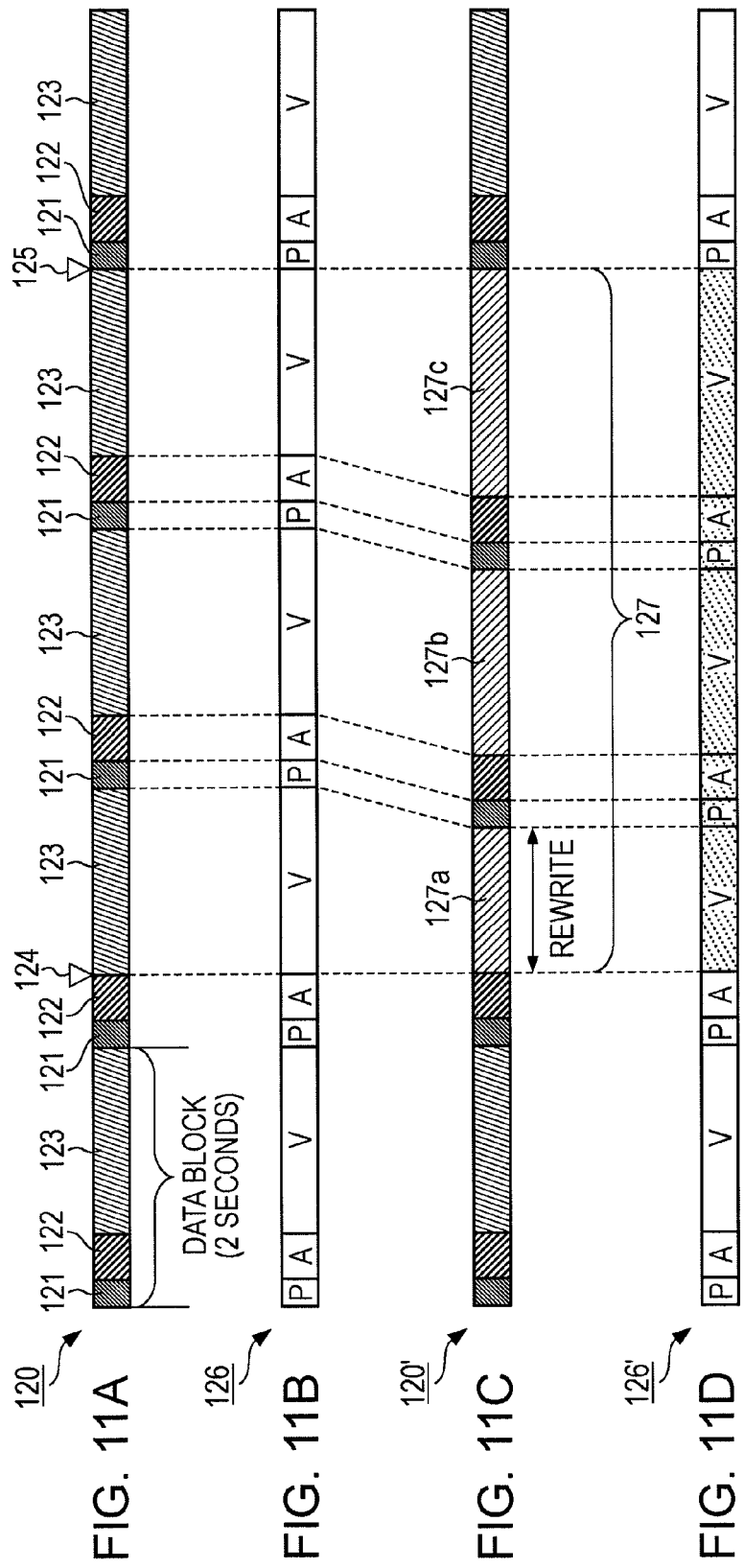

VIDEO AND AUDIO RECORDING APPARATUS AND EDITING METHOD

BACKGROUND OF THE INVENTION

1. Field of the Invention

The present invention relates to a video and audio recording apparatus and an editing method suitable for, for example, overwriting video data and audio data recorded in a recording medium in order to edit the data.

2. Description of the Related Art

In general, digital video data and/or digital audio data (hereinafter also referred to as "AV data") captured by a video camera and recorded in a recording medium are edited as necessary. In short, in the editing operation, a desired video clip is extracted from playback AV data in a recording medium, and the start point (the IN point) and the end point (the OUT point) are marked. Thereafter, a plurality of video clips based on the IN point and the OUT point of each of the clips are connected together. Thus, video formed from the desired video clips that are continuously connected is obtained.

In general, edit data and the base data are compression encoded using a predetermined method. The data is separated into data blocks having a predetermined size (data size) and recorded onto a recording medium. When the AV data is recorded onto the recording medium, the header information and the footer information are written to the recorded AV data. While the AV data is being edited, the header information and the footer information are updated in accordance with an operation of editing.

In addition, the above-described IN point and OUT point are input to an input unit used for editing and are transmitted to an editing apparatus via a communication interface. For example, the IN point is specified by an EDIT ON signal, and the OUT point is specified by an EDIT OFF signal. Upon receiving the EDIT ON signal or EDIT OFF signal, the editing apparatus controls each of the components of the editing apparatus to start editing or stop editing. Thus, an editing operation is performed.

As used herein, a data chunk for which it is necessary for an application that handles AV data to continuously play back, that is, a data chunk that is to be played back in real time is referred to as a "clip". An example of a clip is a data chunk obtained from start to end of image capturing performed by a video camera. In reality, a clip is in the form of a single file or a plurality of files. In addition, a file system (FS) is disposed at each of the logical addresses of the top and end of the recording medium. Any data is recorded in the logical address space in a predetermined format called a "file". In general, such data on the recording medium is managed on a per file basis. The management information of the file is recorded in the file system. Accordingly, a control unit of a video and audio recording apparatus can manage a variety of types of data on a recording medium by referring to and handling the information in the file system.

Furthermore, when the sizes of the data blocks of the video/audio data are the same (a fixed length), existing video and audio recording apparatuses can perform destructive insert editing in real time by overwriting edit video data and audio data onto the base data. As used herein, an original file to which video data and audio data are overwritten is referred to as a "base file". In addition, the data of the file is referred to as "base data". The video data and audio data that are overwritten onto the base data are referred to as "edit data". Furthermore, logically overwrite editing in which part of the base data is logically deleted and the edit data is inserted into the deleted area is referred to as "destructive insert editing" or simply "destructive editing".

As described above, destructive editing is performed using the file system. The "file system" manages information regarding the physical position of a data block stored in a file and management information regarding logical links among the data blocks. In this example, when video data is transferred at a transfer rate of 50 Mbps and the audio data has a 24-bit/8-channel format, the size of data contained in a data block is 15.8 Mbytes. In addition, each of the audio data and the video data contained in a data block corresponds to data having a playback time of about 2 seconds.

FIGS. 9A to 9C illustrate an example of existing video editing. More specifically, FIG. 9A illustrates an example of the structure of a base file 100. The base file 100 includes a plurality of data blocks. Each of the data blocks includes a proxy/RT field 101 ("RT" stands for real time meta data), an audio field 102, and a video field 103. The fields 101 to 103 have a fixed length. In addition, the data blocks have a fixed length.

FIG. 9B illustrates an example of destructive editing performed on video data included in the base file 100. In this example, data in the middle of the video field 103 is overwritten with new video data 106. In destructive editing of the video data 106, the start point is defined when an IN point 104 is specified using an external controller, and the end point is defined when an OUT point 105 is specified. Thereafter, the video fields 103 located from the IN point 104 to the OUT point 105 are overwritten with the video data 106 serving as edit data.

FIG. 9C illustrates an example of a file system 107. The file system 107 manages the size of data of the proxy/RT field 101, the audio field 102, and the video field 103, each having a fixed length, included in the base file 100. Accordingly, as shown in FIG. 9B, even when the part starting from the middle of the video field 103 is overwritten with the video data 106, the data size of each of the fields remains unchanged. Consequently, it is not necessary to update the file system 107. Thus, even when the video field 103 is simply overwritten with the video data 106, the video data functions as an edited base file 100. This also applies to the case in which audio data included in the audio field 102 is subjected to destructive editing.

Japanese Unexamined Patent Application Publication No. 2008-53839 describes a technique for editing video using an editing apparatus and a video recording and reproducing apparatus disposed on the reproducing side and the recording side.

Japanese Unexamined Patent Application Publication No. 2006-140722 describes a technique for recovering inconsistency between data items recorded in a recording medium even when recording of data is abnormally terminated.

SUMMARY OF THE INVENTION

However, in the existing method, even when part of the base file (a data block) is deleted and is overwritten with a different data block, the different data block is not written to a physical area that is the same as the physical area in which the deleted part of the file was recorded.

FIGS. 10A and 10B illustrate an example of data blocks changed when a base file is edited using an existing method. More specifically, FIG. 10A illustrates a logical layout of data blocks. In this example, for convenience of description, identification symbols "A" to "F" are attached to the data blocks.

First, data blocks 111 and 112 having identification symbols "D" and "E" assigned thereto are discussed.

When the data block 111 is deleted from a file 110, the data block 111 is logically invisible. In addition, the size of the file 110 is reduced. However, when a data block 111' having a data size the same as that of the data block 111 and having the identification symbol D' assigned thereto is additionally written to the file 110, the data size of the file 110 is the same as that before the data block 111 is deleted.

FIG. 10B illustrates an example of a physical layout of data blocks when the file is overwritten. In this example, the physical locations of the data blocks having the identification symbols "A" to "F" shown in FIG. 10A in the recording medium are described. In this example, the physical layout includes a file area in which the file 110 is recorded, different file areas in which files other than the file 110 are recorded, and an unrecorded area in which no files are recorded.

First, when the file 110 is continuously recorded in the recording medium, the identification symbols "A" to "E" are continuously arranged. However, if the data block 111 is deleted from the file 110, the area in which the data block 111 was recorded is physically released. When the area is physically released, the area serves as an unrecorded area.

When a data block having the identification symbol D' assigned thereto is additionally written after the area in which the data block 111 was recorded is physically released, the data block is recorded in one of the unrecorded areas. However, the data block is not necessarily recorded in the unrecorded area where the data block 111 was recorded. For example, the data block is recorded in data block 111'.

In this way, if the data block 111' is written to a location that is out of the sequence of the data blocks A to E, the physical addresses of the data blocks are not continuous. Accordingly, a plurality of data blocks are frequently deleted and additionally written, fragmentation occurs. Thus, the performance of file access may be degraded.

In addition, if the data blocks have a variable length, it is not easy to delete a data block and additionally write a data block. FIGS. 11A to 11D illustrate an example of editing variable length data in which the data size of each of data blocks may not be the same. FIG. 11A illustrates an example of the structure of a base file 120. The base file 120 includes a plurality of continuous data blocks. Each of the data blocks includes a proxy/RT field 121, an audio field 122, and a video field 123. The data contained in a data block corresponds to data having a playback time of about 2 seconds.

FIG. 11B illustrates an example of a file system 126. The file system 126 manages the size of data of the proxy/RT field 121, the audio field 122, and the video field 123, each having a fixed length, included in the base file 120.

FIG. 11C illustrates an example in which variable length video data 127 is written to the base file 120. In this example, an example in which an area of the base file 120 (refer to FIG. 11A) starting from an IN point 124 to an OUT point 125 is overwritten with the video data 127 and a file 120' is generated is illustrated. Since a data block included in the video data 127 has a variable length, data blocks 127a to 127c having different data sizes are written to the video fields 123 of the base file 120.

If, as described above, the base file 120 is updated using variable length video data, the logical locations of the video data and audio data managed by the file system 126 are changed. Accordingly, in order to correctly read out the video data, it is necessary to update the file system 126 to a file system 126' so that the data size of the data block is the same as that of the data block included in the file 120'. Furthermore, in this example, only the video data having a fixed length is rewritten with the video data having a variable length. However, the logical location of the audio data is also changed. Accordingly, in order to correctly read out the audio data, it may be necessary to update the file system 126'. Similarly, even when destructive editing is performed on only the audio data included in the audio field 122 using edited audio data having a variable length, it is necessary to update the file system 126' in order to read out the video data.

For example, if the compression codec for the video data is not an intra frame codec but an inter frame codec (e.g., Moving Picture Experts Group (MPEG)), the data size of each frame is variable. Accordingly, it is difficult to establish a file system simply by overwriting variable length video data or audio data onto the base data. Thus, it is difficult to provide destructive editing.

Accordingly, the present invention provides a video and audio recording apparatus and an editing method for preventing edit data items from being located at physically separate locations when base data recorded in a recording medium is subjected to destructive editing using the edit data.

According to an embodiment of the present invention, a video and audio recording apparatus includes a recording medium configured to record base data including first video data and/or first audio data therein on a predetermined unit-of-recording basis and a control unit configured to start destructive editing in response to an instruction to start editing received through an operation unit and stop the destructive editing in response to an instruction to stop editing received through the operation unit. The destructive editing represents editing in which the base data is deleted on the predetermined unit-of-recording basis and edit data including second video data and/or second audio data and formed on a variable length units-of-recording basis is overwritten onto the base data on the predetermined unit-of-recording basis. The edit data is input from the base data read from the recording medium on the predetermined unit-of-recording basis in synchronization with a speed at which the first video data and/or first audio data are reproduced. When part of the base data is deleted, the control unit writes, using management information for managing a physical area of the base data in the recording medium on the predetermined unit-of-recording basis, information indicating that the physical area in which the deleted part of the base data was recorded is defined as a reserved area on the predetermined unit-of-recording basis to the management information. When the edit data is input in response to the instruction to start editing, the edit data is overwritten into the physical area managed using the management information and defined as the reserved area on a preferential basis.

In this way, variable length edit data can be overwritten onto the base data so that the edit data is written into the reserved area indicated by the reservation information recorded in the recording medium on a preferential basis.

According to the present invention, a physical area in which the deleted base data was recorded is allocated as reservation information, the variable length edit data can be overwritten into the reserved area on a preferential basis. Accordingly, the physical areas into which the edit data is written are not separated from each other. Thus, the occurrence of fragmentation can be prevented. In addition, the performance of accessing data in the recording medium is not advantageously degraded.

BRIEF DESCRIPTION OF THE DRAWINGS

FIG. 3 is a block diagram illustrating an example of the internal configuration of a data conversion sub-unit according to an embodiment of the present invention;

FIGS. 4A and 4B illustrate an example of data blocks changed when a file according to an embodiment of the present invention is edited;

FIGS. 9A to 9C illustrate an example of existing video editing;

FIGS. 10A and 10B illustrate an example of data blocks changed when a file is edited using an existing method; and FIGS. 11A to 11D illustrate an example of video editing in which variable length data is edited and a file system is updated.

DESCRIPTION OF THE PREFERRED EMBODIMENTS

The best mode for carrying out the invention (hereinafter referred to as an "embodiment") is described below. Note that the description is made in the following order:

1. Embodiment (Example of Updating Recording Area When Destructive Editing Is Performed in Real Time)
2. Modifications 1. Embodiment
Example of Updating Recording Area When Destructive Editing Is Performed in Real Time An embodiment of the present invention is described below with reference to FIGS. 1 to 8. According to the present embodiment, an example in which the present invention is applied to a video and audio recording apparatus 1 that records video data and audio data is described.

Figure 1:
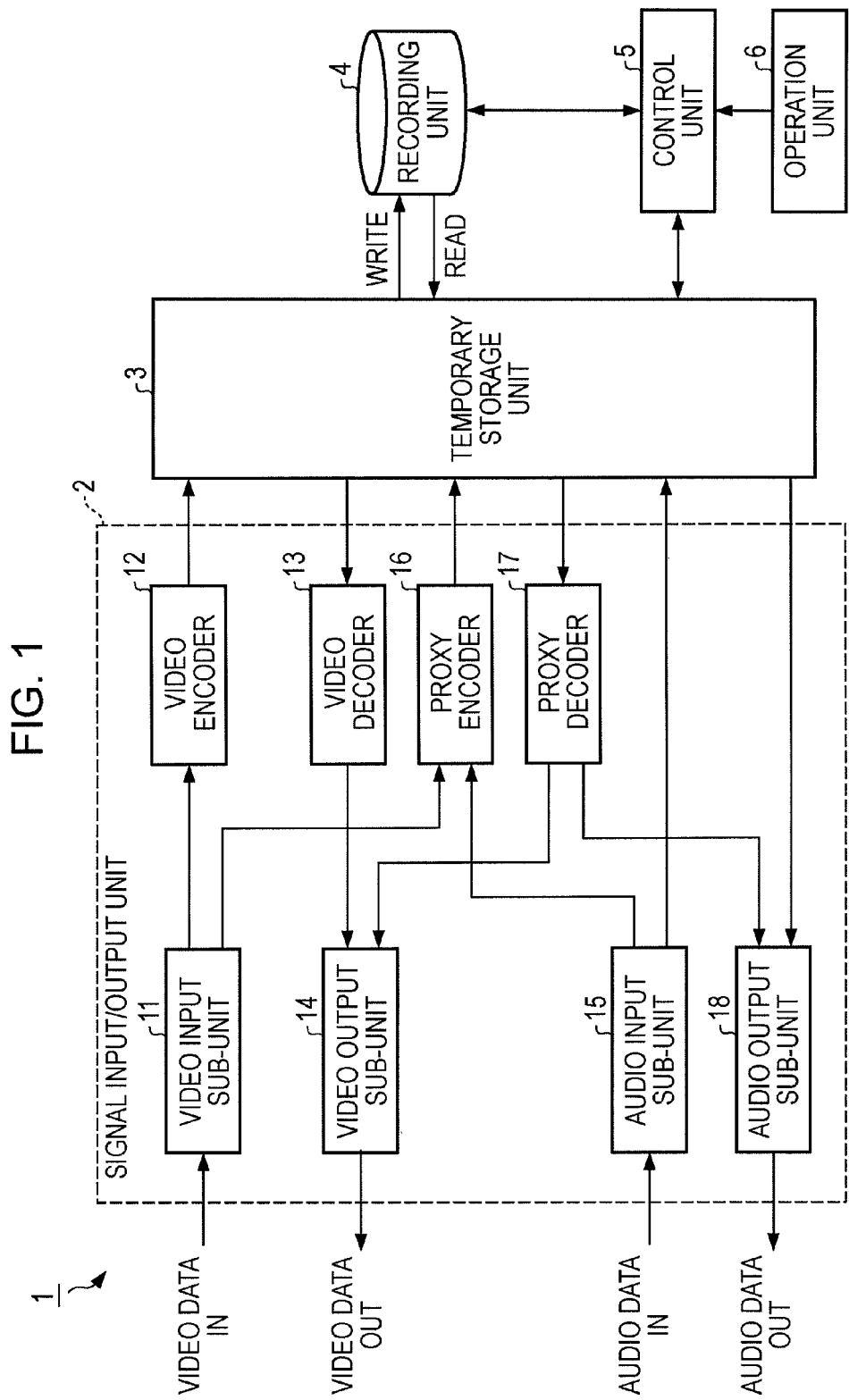
FIG. 1 is a block diagram illustrating the internal configuration of the video and audio recording apparatus according to an embodiment of the present invention.

FIG. 1 illustrates the internal configuration of the video and audio recording apparatus 1 according to the present embodiment. The video and audio recording apparatus 1 includes a signal input/output unit 2 that performs predetermined processing on a video signal of input video data and an audio signal of input audio data and a temporary storage unit 3 that temporarily stores the video data and audio data. In addition, the video and audio recording apparatus 1 includes a recording unit 4 that records the video data and audio data in the form of base data and a control unit 5 that controls writing and reading of the base data to and from the recording unit 4. Furthermore, the video and audio recording apparatus 1 includes an operation unit 6 that instructs the control unit 5 to write and read the base data in response to a user operation.

The signal input/output unit 2 includes a video input sub-unit 11 that receives video data and a video encoder 12 that encodes the video data received by the video input sub-unit 11 into a predetermined format. In addition, the signal input/output unit 2 includes a video decoder 13 that decodes the video data read out of the recording unit 4 via the temporary storage unit 3 and a video output sub-unit 14. Furthermore, the signal input/output unit 2 includes an audio input sub-unit 15 that receives audio data and an audio output sub-unit 18 that outputs the audio data read out of the recording unit 4 via the temporary storage unit 3. Still furthermore, the signal input/output unit 2 includes a proxy encoder 16 that encodes the input video data and audio data into low bit-rate proxy data and a proxy decoder 17 that decodes proxy data into video data and audio data.

Proxy data encoded by the proxy encoder 16 is recorded in the recording unit 4 via the temporary storage unit 3 by the control unit 5. Thereafter, the video and audio recording apparatus 1 decodes encoded video data and audio data read from the recording unit 4. The video and audio recording apparatus 1 then supplies the decoded video data to the video output sub-unit 14 and supplies the decoded audio data to the audio output sub-unit 18.

The video data input to the video input sub-unit 11 and output from the video output sub-unit 14 is obtained from a high-definition video signal. Note that video data and audio data are included in a video file and an audio file, respectively. The video file and the audio file include fixed length or variable length data blocks. Accordingly, the control unit 5 controls writing of data into the recording unit 4 and deleting and reading of data in the recording unit 4 on a per data block basis. For example, a high-capacity hard disk drive unit or a rewritable optical disk unit can be used as the recording unit 4.

Figure 2:
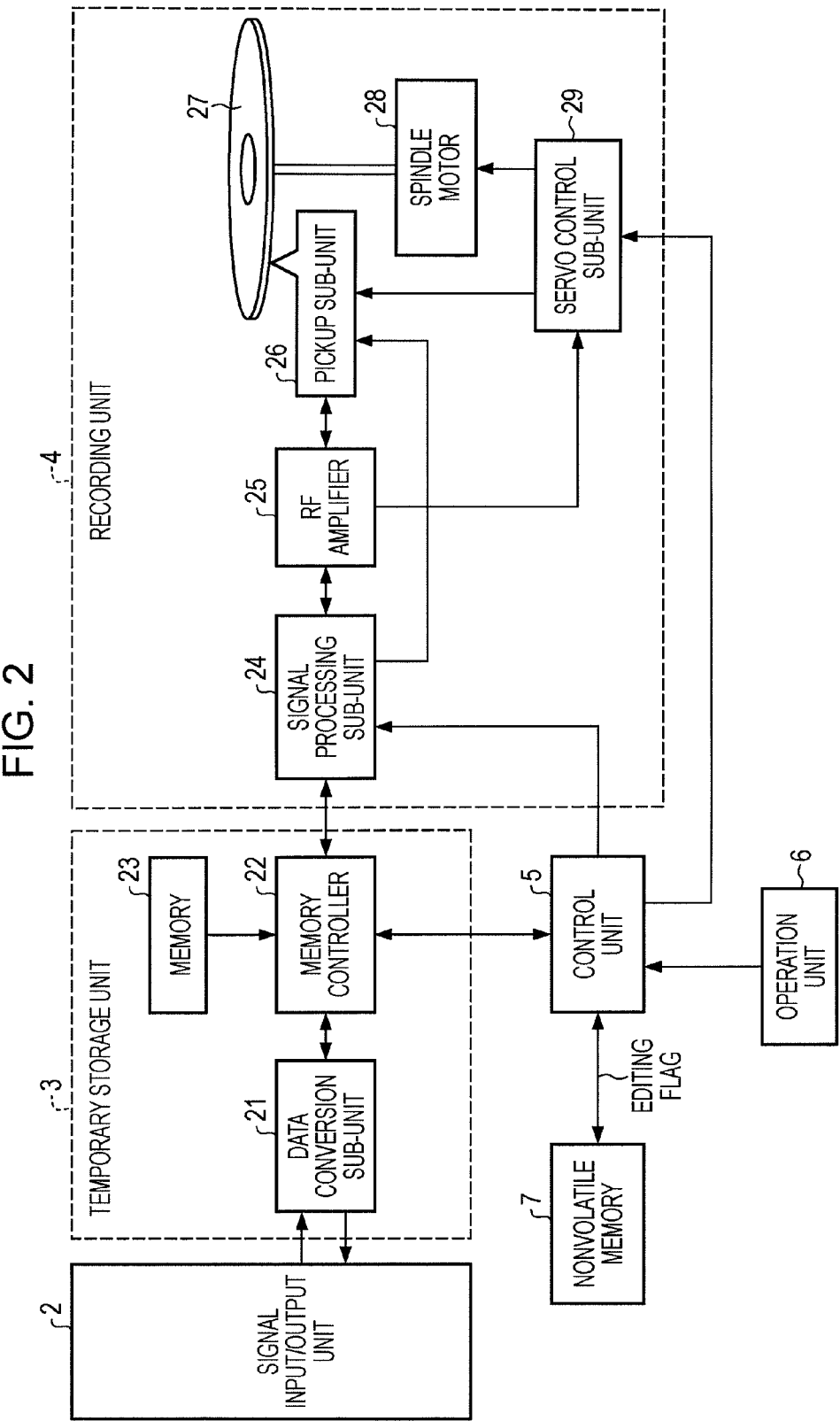
FIG. 2 is a block diagram illustrating the internal configurations of a temporary storage unit and a recording unit according to an embodiment of the present invention.

FIG. 2 illustrates an example of the internal configurations of the temporary storage unit 3 and the recording unit 4.

The signal input/output unit 2 outputs the video signal and the audio signal subjected to predetermined processing to the temporary storage unit 3. The temporary storage unit 3 includes a data conversion sub-unit 21 that compresses and decompresses data, a memory 23 that temporarily stores the data, and a memory controller 22 that controls the amount of data stored in the memory 23.

The recording unit 4 includes a signal processing sub-unit 24 that generates a signal to be recorded from data to be recorded and generates reproduction data from a reproduction signal, a radio frequency (RF) amplifier 25 that generates an RF signal, and a pickup sub-unit 26 that emits a laser beam having a predetermined light intensity onto an optical disk 27. In addition, the recording unit 4 includes a spindle motor 28 that rotates the optical disk 27 serving as a recording medium and a servo control sub-unit 29 that controls the operations of the pickup sub-unit 26 and the spindle motor 28. The optical disk 27 records base data including first video data and/or first audio data therein on a per data block basis. According to the present embodiment, the same file system is recorded in each of the innermost circumferential portion and the outermost circumferential portion of the optical disk 27.

The spindle motor 28 rotates the optical disk 27 at a constant linear velocity (CLV) or at a constant angular velocity (CAV) in accordance with a spindle motor drive signal output from the servo control sub-unit 29.

The pickup sub-unit 26 controls the output of the laser beam in accordance with a recording signal supplied from the signal processing sub-unit 24 so as to record the signal to be recorded on the optical disk 27. In addition, the pickup sub-unit 26 collects the laser beam and emits the laser beam onto the optical disk 27. Furthermore, the pickup sub-unit 26 photoelectrically converts a light beam reflected by the optical disk 27 and generates an electrical current signal, which is supplied to the RF amplifier 25. Note that the position at which the laser beam is emitted is controlled by a servo signal supplied from the servo control sub-unit 29 to the pickup sub-unit 26 so that the laser beam is emitted to a predetermined position.

The RF amplifier 25 generates a pair of a focus error signal and a tracking error signal and a reproduction signal using the electrical current signal received from the pickup sub-unit 26. Thereafter, the RF amplifier 25 supplies the focus error signal and the tracking error signal to the servo control sub-unit 29 and supplies the reproduction signal to the signal processing sub-unit 24.

The servo control sub-unit 29 controls a focus servo operation and a tracking servo operation. More specifically, the servo control sub-unit 29 generates a focus servo signal and a tracking servo signal using the focus error signal and the tracking error signal received from the RF amplifier 25, respectively, and supplies the focus servo signal and tracking servo signal to an actuator (not shown) of the pickup sub-unit 26. In addition, the servo control sub-unit 29 generates a spindle motor drive signal used for driving the spindle motor 28 and controls the spindle servo operation so that the optical disk 27 is rotated at a predetermined rotation speed.

Furthermore, the servo control sub-unit 29 moves the pickup sub-unit 26 in the radial direction of the optical disk 27. Thus, the servo control sub-unit 29 performs thread control in order to change the position to which the laser beam is emitted. Note that the position in the optical disk 27 from which data is read is determined by the control unit 5. The location of the pickup sub-unit 26 is controlled so that a signal is read from the determined readout position.

The signal processing sub-unit 24 modulates the data to be recorded input from the memory controller 22 and generates a recording signal. The signal processing sub-unit 24 then supplies the generated recording signal to the pickup sub-unit 26. In addition, the signal processing sub-unit 24 demodulates a reproduction signal received from the RF amplifier 25 and generates reproduction data. The signal processing sub-unit 24 then supplies the reproduction data to the memory controller 22.

As described in more detail below, the memory controller 22 stores the data to be recorded received from the data conversion sub-unit 21 in the memory 23. The memory controller 22 reads the stored data and supplies the data to the signal processing sub-unit 24 as necessary. In addition, the memory controller 22 stores reproduction data received from the signal processing sub-unit 24 in the memory 23. The memory controller 22 reads the stored data and supplies the data to the data conversion sub-unit 21 as necessary.

The data conversion sub-unit 21 compresses the signals of an image and sound captured by a video camera (not shown) and supplied from the signal input/output unit 2 or a signal reproduced from a recording medium (not shown) and generates data to be recorded. Thereafter, the data conversion sub-unit 21 supplies the compressed signals to the memory controller 22. At that time, for example, a moving picture experts group (MPEG) method or a joint photographic experts group (JPEG) method is employed. In addition, the data conversion sub-unit 21 decompresses the reproduction data supplied from the memory controller 22 as necessary and converts the reproduction data into an output signal having a predetermined format. Thereafter, the data conversion sub-unit 21 supplies the output signal to the signal input/output unit 2.

In response to an operation signal received from the operation unit 6, the control unit 5 controls the servo control sub-unit 29, the signal processing sub-unit 24, the memory controller 22, and the data conversion sub-unit 21 to perform a recording and reproduction process. For example, the operation unit 6 is operated by a user and supplies, to the control unit 5, an operation signal generated in accordance with the operation.

When the user operates the operation unit 6 and instructs data recording through the operation unit 6, the data supplied from the signal input/output unit 2 is supplied to the optical disk 27 via the data conversion sub-unit 21, the memory controller 22, the signal processing sub-unit 24, and the pickup sub-unit 26. Thus, the data is recorded.

In contrast, when the user operates the operation unit 6 and instructs data reproduction through the operation unit 6, the data is read from the optical disk 27 via the pickup sub-unit 26, the RF amplifier 25, the signal processing sub-unit 24, the memory controller 22, and the data conversion sub-unit 21. Thus, the data is reproduced. The reproduced data is supplied to the signal input/output unit 2.

The control unit 5 further includes a nonvolatile memory 7 that holds stored data even when the power supply is shut off. When video data and audio data are written to the recording unit 4, the control unit 5 sets, in the nonvolatile memory 7, an "editing flag" that indicates which area of the recording unit 4 is being edited.

The control unit 5 uses edit data for destructive editing. The edit data includes variable length blocks. The edit data is read from the base data recorded in the optical disk 27 on a per data block basis and is input to the control unit 5 in synchronization with the playback speed of the first video data and/or the first audio data. According to the present embodiment, second video data and/or second audio data serving as edit data are input to the video and audio recording apparatus 1 via the video input sub-unit 11 and the audio input sub-unit 15. At that time, destructive editing is started in response to the instruction to start editing received through the operation unit 6. In the destructive editing, the base data is deleted on a per data block basis and is overwritten with the edit data on a per data block basis. Thereafter, in response to an instruction to stop editing received through the operation unit 6, the destructive editing is stopped.

The control unit 5 controls destructive editing of the base data on a per data block basis using the file system that manages the physical area of the optical disk 27. That is, when part of the base data is deleted, the control unit 5 writes, to the file system, information indicating that the physical area of the optical disk 27 in which the deleted part of the base data was recorded is defined as a reserved area for each of the deleted blocks. Thereafter, when edit data is input in response to the instruction to start editing, the control unit 5 overwrites the edit data into the physical area managed by the file system as a reserved area on a preferential basis.

After the first video data and/or the first audio data read from the base data is subjected to the destructive editing, part of the first video data and/or the first audio data is overwritten with the second video data and/or the second audio data, and the first video data and/or the first audio data are output to the video output sub-unit 14 and the audio output sub-unit 18.

FIG. 3 illustrates an example of the internal configuration of the data conversion sub-unit 21.

When data is recorded on the optical disk 27, a signal to be recorded is supplied from the signal input/output unit 2 to a demultiplexer 31. The demultiplexer 31 separates a plurality of related data sequences from the signal supplied from the signal input/output unit 2 and supplies the data sequences to a data amount detecting sub-unit 32. Examples of the separated data sequences include a moving image signal (e.g., a baseband image signal) and an audio signal (e.g., a baseband audio signal) associated with the moving image signal.

The data amount detecting sub-unit 32 directly supplies the image signal and the audio signal supplied from the demultiplexer 31 to an image signal conversion sub-unit 33 and an audio signal conversion sub-unit 34, respectively. In addition, the data amount detecting sub-unit 32 detects the amount of the image signal and the amount of the audio signal and supplies the information regarding the amounts to the memory controller 22. That is, the data amount detecting sub-unit 32 detects, for example, the amounts of data of the image signal and the audio signal supplied from the demultiplexer 31 and having a predetermined playback time. The data amount detecting sub-unit 32 then supplies that information to the memory controller 22.

The image signal conversion sub-unit 33 MPEG-encodes the image signal supplied from the data amount detecting sub-unit 32 so that, for example, all of the frames are encoded into I (Intra) pictures and supplies the resulting image data sequence to the memory controller 22. In addition, the audio signal conversion sub-unit 34, for example, MPEG-encodes the audio signal supplied from the data amount detecting sub-unit 32 and supplies the resulting audio data sequence to the memory controller 22. Thereafter, the image data and audio data supplied from the memory controller 22 are supplied to the optical disk 27 and are recorded on the optical disk 27.

In contrast, when data read from the optical disk 27 is reproduced, image data or audio data is read from the optical disk 27. The image data is supplied from the memory controller 22 to an image data conversion sub-unit 35, and the audio data is supplied from the memory controller 22 to an audio data conversion sub-unit 36.

The image data conversion sub-unit 35, for example, MPEG-decodes the data sequence of the image data supplied from the memory controller 22 and supplies the resultant image signal to a multiplexer 37. In addition, the audio data conversion sub-unit 36, for example, MPEG-decodes the data sequence of the audio data supplied from the memory controller 22 and supplies the resultant audio signal to a multiplexer 37.

The multiplexer 37 supplies the image signal supplied from the image data conversion sub-unit 35 and the audio signal supplied from the audio data conversion sub-unit 36 to the signal input/output unit 2. Note that the multiplexer 37 reads only one of image data and audio data from the optical disk 27. Accordingly, when only one of image data and audio data is supplied from the image data conversion sub-unit 35 or the audio data conversion sub-unit 36 is supplied, one of the image data and audio data is supplied to the signal input/output unit 2.

Alternatively, the multiplexer 37 reads both image data and audio data from the optical disk 27. Accordingly, when the image signal and audio signal are supplied from the image data conversion sub-unit 35 and the audio data conversion sub-unit 36, the multiplexer 37, for example, multiplexes the image signal and audio signal and supplies the two signals to the signal input/output unit 2. However, the multiplexer 37 can independently output the image signal and audio signal in parallel.

FIGS. 4A and 4B illustrate data blocks changed when a file according to the present embodiment is edited. In this example, each of the data blocks recorded on the optical disk 27 has a variable length.

FIG. 4A illustrates an example of the logical layout of data used when a file is overwritten. For convenience of description, identification symbols "A" to "F" are attached to the data blocks. First, data blocks 41 and 42 having identification symbols "D" and "E" assigned thereto are discussed.

If the data block 41 is deleted from a file 40, the data block 41 is logically invisible. However, according to the present embodiment, an area having a size that is the same as the data size of the data block 41 is allocated as a reserved area 43. Accordingly, even after the data block 41 is deleted, the data size of the file 40 remains unchanged.

Thereafter, the data block 41' having an identification symbol D' is additionally written to the file 40. In this example, the data size of the data block 41' is the same as that of the deleted data block 41. At that time, the data block 41' is overwritten onto the reserved area 43 on a preferential basis. Accordingly, the data size of the file 40 remains unchanged before and after the editing operation for the data block 41 and the data block 41' is performed.

FIG. 4B illustrates an example of the physical layout of data used when a file is overwritten. In this example, the physical layout of the data blocks having the identification symbols A to F assigned thereto (shown in FIG. 4A) in the recording medium is described. A file area in which the file 40 is recorded, a different file area in which files other than the file 40 are recorded, an unrecorded area in which any file is not recorded, and a reserved area are shown in FIG. 4B.

When the file 40 is continuously recorded on the recording medium, the identification symbols A to F representing the data blocks are sequentially arranged. However, if the data block 41 is deleted from the file 40, the area in which the data block 41 was recorded is physically released. When a data block is physically released, the area is considered as an unrecorded area. Accordingly, another file may be recorded in this area.

If another file is written onto the area in which the data block 41 was recorded after the area is physically released, the data block 41' is not written to this area but to a different unrecorded area. Accordingly, when the data block 41' is additionally written, the data block 41' is written to the reserved area on a preferential basis.

In this way, according to the present embodiment, the video and audio recording apparatus 1 is suitable for the case in which destructive editing is performed on the optical disk 27 that allows random access. If edit data to be overwritten has variable-length data blocks, parts of the base file are logically deleted and the data is rewritten. Thereafter, the file system is updated at a predetermined point in time. The parts of the base file are logically deleted, and the physical areas corresponding to the deleted areas are allocated as reserved areas. The edit data are overwritten onto the reserved areas. Accordingly, even when deletion and additional writing of a plurality of data blocks are frequently repeated, the occurrence of fragmentation can be prevented and, therefore, the performance of file access can be maintained unchanged.

FIGS. 5A to 5E illustrate the case in which a predetermined number of data blocks are allocated as reserved areas in advance when destructive editing is performed in real time. Like the above-described example, the data blocks have a variable length.

Figure 5A:
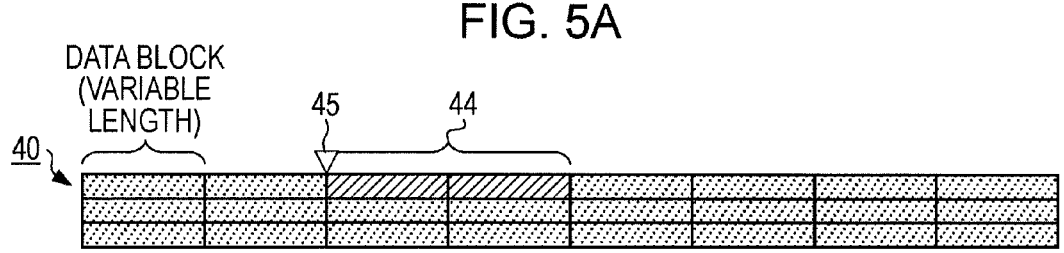
FIGS. 5A to 5E illustrate an example of data blocks changed when real-time editing is performed, according to an embodiment of the present invention.

FIG. 5A illustrates an example of data blocks arranged when an IN point 45 is specified. When the IN point 45 is specified by the operation performed by a user through the operation unit 6, the control unit 5 allocates two data blocks preceding the IN point 45 as a reserved area 44. At that time, the control unit 5 logically deletes the reserved area 44.

Figure 5B:
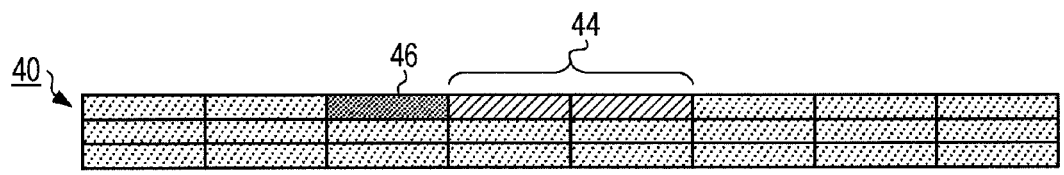

FIG. 5B illustrates an example of data blocks arranged when destructive editing in which one data block starting from the IN point 45 is overwritten is performed. In reality, one data block of a base file starting from the IN point 45 is subjected to destructive editing. The area subjected to destructive editing is included in the reserved area 44 which is allocated in advance.

Figure 5C:
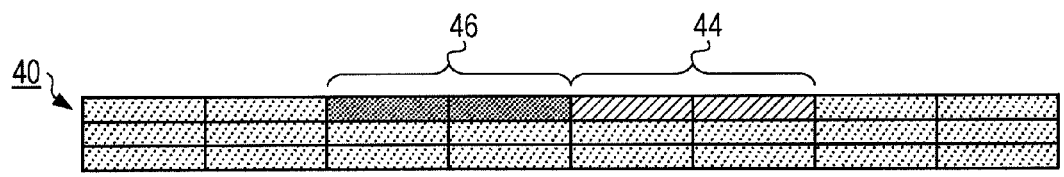

FIG. 5C illustrates an example of data blocks arranged when destructive editing in which two data blocks starting from the IN point 45 is overwritten is performed. Like FIG. 5B, when two data blocks starting from the IN point 45 are overwritten, two data blocks succeeding overwritten data 46 subjected to the destructive editing are allocated as the reserved area 44 in advance.

Figure 5D:
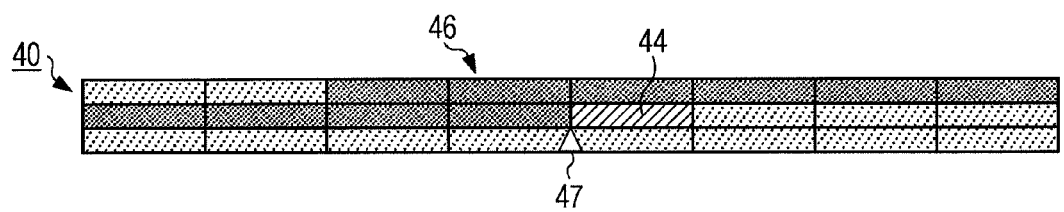

FIG. 5D illustrates an example of data blocks arranged when two or more data blocks starting from the IN point 45 are subjected to destructive editing and an OUT point 47 is specified. Pre-allocation of the reserved area 44 and overwriting of the overwritten data 46 are repeated in real time. Thereafter, when the OUT point 47 is specified by the operation performed by the user through the operation unit 6, the pre-allocation of the reserved area 44 is completed.

Figure 5E:
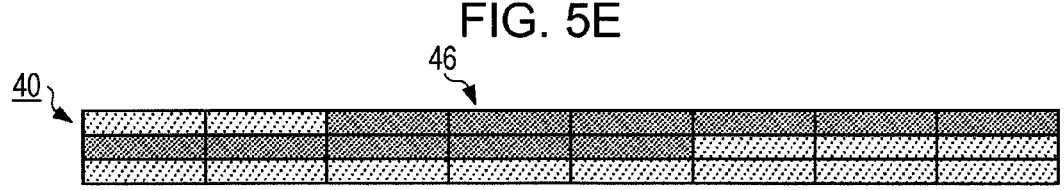

FIG. 5E illustrates an example of data blocks arranged when the destructive editing is completed. After the destructive editing is completed, the control unit 5 updates the file system so that the file system has the latest state. However, if an error occurred, error processing is performed.

In this way, the control unit 5 writes, into the management information, information indicating that a predetermined number of blocks starting from when destructive editing is instructed and arranged in the order in which the base data is reproduced are defined as a reserved area. Thereafter, as the reserved area is used for destructive editing, the control unit 5 shifts the reserved area in the order in which the base data is reproduced. When an instruction to complete editing is received, the definition of the reserved area is deleted from the management information.

After the base file has been overwritten with edit data, the file system is updated. This process is called "write back process". The write back process is performed, for example, at the following points in time:

(1) in real time while destructive editing is being performed (2) after one destructive editing operation has been completed or after a plurality of destructive editing operations have been completed (at one time)

(3) when a removable medium is used as the recording medium of the recording unit 4, at a time when the removable medium is dismounted from the video and audio recording apparatus 1

(4) when the video and audio recording apparatus 1 enters a standby off mode (5) when a secondary power supply is turned off The video and audio recording apparatus 1 may employ one of the above-described points in time (1) to (5) or a combination of any of the above-described points in time (1) to (5). In particular, when destructive editing performed by the recording unit 4 is controlled by an external editing apparatus and if a write back process is performed, the external editing apparatus may operate in an unexpected manner. In such a case, it is desirable that the write back process be performed after all of the editing operations have been completed.

An editing process including a write back process and a reboot process performed by the video and audio recording apparatus 1 are described next with reference to FIGS. 6 to 8.

Figure 6:
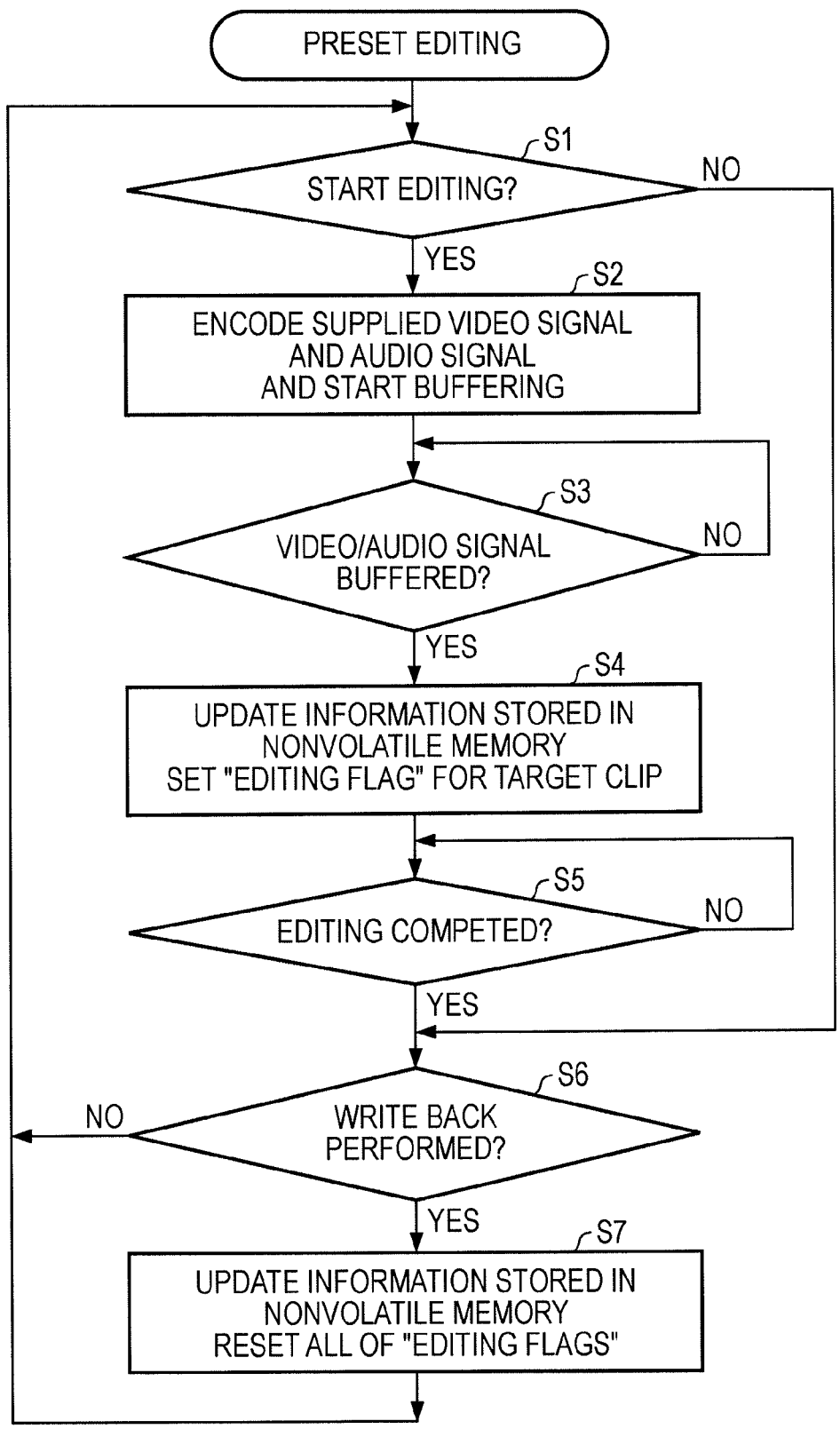
FIG. 6 is a flowchart illustrating an exemplary file editing process according to an embodiment of the present invention.

FIG. 6 is a flowchart illustrating an exemplary editing process including a write back process. In this editing process, the control unit 5 sets the "editing flag" in the nonvolatile memory 7. The editing flag indicates that the base data is being subjected to destructive editing. When the destructive editing is normally completed, the control unit 5 resets the editing flag. An example of the editing process is described in detail below.

First, when triggered by a user instruction to specify an IN point received from the operation unit 6, the control unit 5 determines whether destructive editing is started (step S1). If the control unit 5 determines that destructive editing is not started, the processing proceeds to step S6 (described below).

Subsequently, the memory controller 22 starts a buffering process in which video data encoded by the video encoder 12, proxy data encoded by the proxy encoder 16, and audio data are temporarily stored in the memory 23 (step S2). The information regarding the state of the buffering process is sent to the control unit 5 as necessary.

Subsequently, the control unit 5 determines whether a predetermined amount of the encoded video data, proxy data, and audio data is buffered in the memory 23 (step S3).

If buffering in the memory 23 has not been completed, the control unit 5 continues to buffer the data in the memory 23. However, if buffering in the memory 23 has been completed, the control unit 5 updates the information stored in the nonvolatile memory 7. More specifically, the control unit 5 sets the "editing flag" so that the editing flag indicates that the target clip is being subjected to destructive editing (step S4).

Thereafter, the control unit 5 determines whether the destructive editing is completed by receiving a user instruction to specify an OUT point through the operation unit 6 (step S5). If the destructive editing has not been completed, the control unit 5 continues to set the editing flag. However, if the destructive editing has been completed, the control unit 5 determines whether a write back process is performed (step S6).

If a write back process has not been performed, the processing of the control unit 5 returns to step S1 and the destructive editing is continuously performed. However, if a write back process has been performed, the control unit 5 updates the information stored in the nonvolatile memory 7. More specifically, the control unit 5 resets the editing flags for all of the clips subjected to the destructive editing (step S7). Thereafter, the processing returns to step S1.

If an error occurs when the file system is updated, the file system may not be updated normally. For example, if a primary power supply (e.g., a main power supply of the video and audio recording apparatus 1) is turned off before the file system is updated and, therefore, the process is incomplete, data inconsistency occurs in the file or the data. It is difficult to normally reproduce such a file or data having data inconsistency. In particular, the audio data may generate unexpected noise. Accordingly, in such a case, it is necessary that at least the volume of the audio signal be reduced. To solve such a problem, if the processing from destructive editing to a write back process is not successfully completed, the status of the audio format recorded in an index file is changed to "non-audio". The index file is described next.

Figure 7:
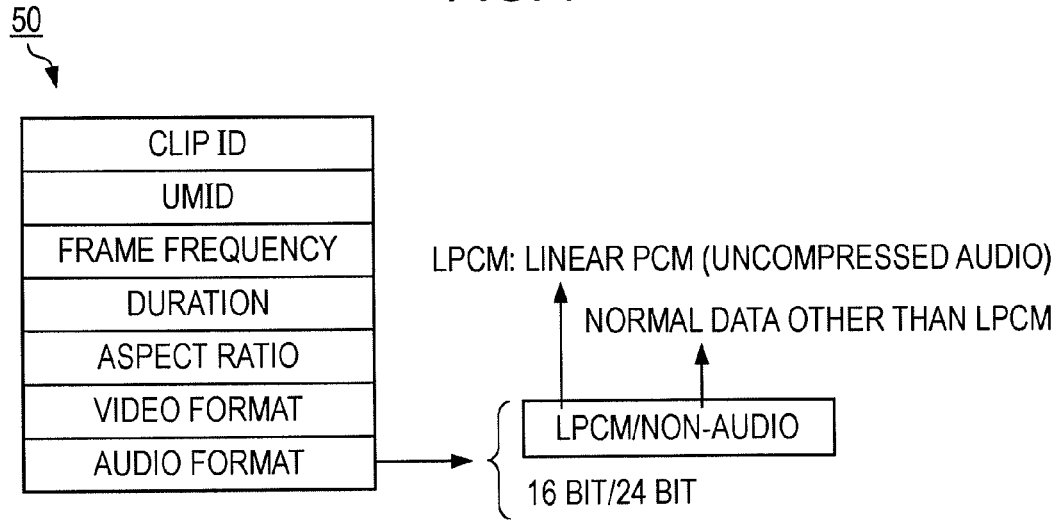
FIG. 7 illustrates an exemplary structure of an index file according to an embodiment of the present invention.

FIG. 7 illustrates an exemplary structure of an index file 50. Like the file system, the index file 50 is generated in each of the outermost periphery and the innermost periphery of the optical disk 27. The index file 50 indicates the information regarding the base data for each of the clips each including at least one block. The information recorded in the index file 50 is supplied from the recording unit 4 to the audio output sub-unit 18 via the temporary storage unit 3. The index file 50 includes the following information: clip IDs for uniquely identifying a plurality of clips, UMIDs which are unique IDs assigned to the clips, the frame frequency of the video data, the number of frames, the aspect ratio of the video data, and the video and audio format.

According to the present embodiment, when a normal audio file is stored, the status of the audio format is set to "linear PCM". Thus, it can be recognized that the audio data is recorded on the optical disk 27. However, when the status of the audio format is "non-audio", it can be recognized that normal data other than linear PCM data is recorded on the optical disk 27. In this case, it is recognized that the data is not appropriate for outputting the data in the form of audio data.

Figure 8:
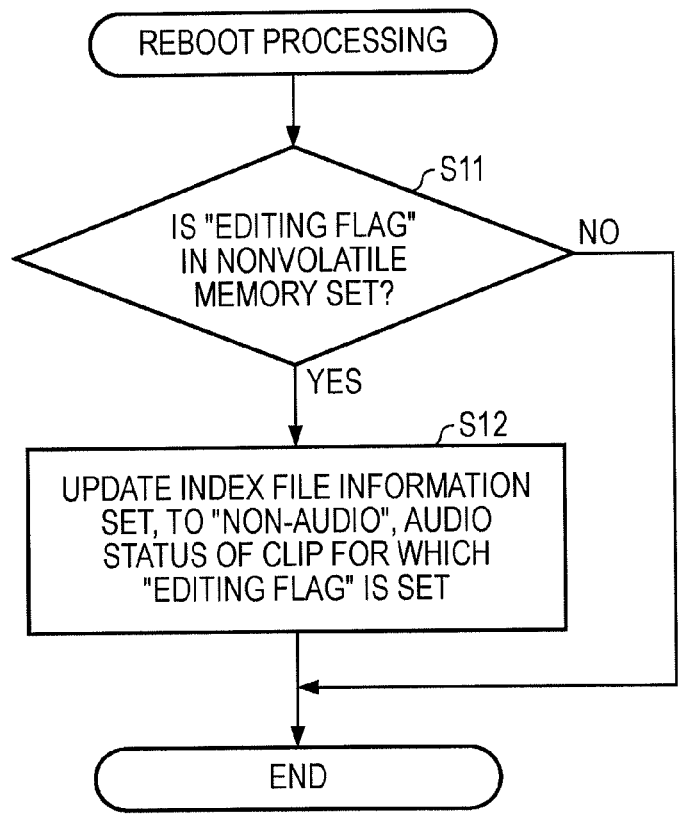
FIG. 8 is a flowchart illustrating an exemplary file editing process according to an embodiment of the present invention.

FIG. 8 is a flowchart illustrating an exemplary reboot process performed by the video and audio recording apparatus 1 when the update process of the file system is abnormally terminated. In order to restart the destructive editing after the update process of the file system has been abnormally terminated, the control unit 5 searches for a data block of the base data in which first audio data is to be recorded using the editing flag set in the nonvolatile memory 7. Thereafter, the control unit 5 writes, into the management information, the status indicating that data other than the first audio data and the second audio data has been recorded in the found data block included in the base data. An example of this processing is described in more detail below.

First, the control unit 5 determines whether the editing flag stored in the nonvolatile memory 7 is set (step S11). If the editing flag is reset, an error has not occurred during updating of the file system. Accordingly, the control unit 5 completes the processing.

However, if the editing flag is set, the control unit 5 updates the index file information (step S12). In updating the index file information, the control unit 5 sets, to "non-audio", the audio format for which the editing flag is set. Subsequently, the control unit 5 completes the reboot process.

As described above, in existing processes, if an error occurs during destructive editing and, therefore, inconsistent audio data is recorded, it is difficult to reproduce the audio data of the entire clip. However, the audio data other than the inconsistent audio data is consistent. Accordingly, it is desirable that as much of the audio data be reproduced as possible. According to the present embodiment, the control unit 5 of the video and audio recording apparatus 1 can recognize that a file for which editing is incomplete is present by determining whether the editing flag in the nonvolatile memory 7 is set. Thereafter, the control unit 5 sets the status of the audio format included in the file to "non-audio". Thus, the audio signal is considered as data. Accordingly, the audio output sub-unit 18 can easily recover the audio signal. For example, the audio output sub-unit 18 does not output sound for the data portion of the audio field for which "non-audio" is set. As a result, as much of the data other than the audio data that is inconsistent can be reproduced as possible. In addition, when sound is output from a speaker (not shown) using digital audio data supplied from the audio output sub-unit 18, the output of the portion for which "non-audio" is set is stopped. Accordingly, sudden output of noise can be prevented.

As described above, according to the present embodiment, in the video and audio recording apparatus 1, when the control unit 5 performs destructive editing through the recording unit 4 in real time, part of the base data is allocated as a reserved area. Edit data is overwritten onto such a reserved area on a preferential basis. Since the reserved area physically corresponds to an area in which the unedited base data was located, the edit data overwritten through destructive editing is written so as to maintain the physical continuity of the existing base data. Accordingly, fragmentation of the edit data recorded on the optical disk 27 can be advantageously prevented. In addition, when accessing the base data on the optical disk 27, the read and write performance can be increased.

Furthermore, the data blocks of the base data are defined as a reserved area in the order in which the base data is reproduced. As the reserved area is subjected to destructive editing using the edit data, the reserved area is shifted in the order in which the base data is reproduced. Accordingly, when destructive editing is performed in real time, the edit data is not overwritten onto the area other than the reserved area. In this way, in the optical disk 27, the physical continuity of the base data and the edit data can be advantageously maintained.

Still furthermore, while destructive editing is being performed, the control unit 5 sets the "editing flag" in the nonvolatile memory 7. Accordingly, even when the destructive editing is abnormally terminated without performing a write back process due to, for example, accidental power off, the control unit 5 can determine whether the destructive editing is abnormally terminated by referring to the editing flag in the nonvolatile memory 7 during rebooting. Therefore, if the editing flag is set during rebooting, it is highly likely that the inconsistency occurs in the edit data overwritten onto the base data. Thus, the status of the audio data can be set to "non-audio". Consequently, if, during an audio output operation, the control unit 5 outputs silence data for the audio data for which "non-audio" is set, the output of noise can be advantageously prevented.

Still furthermore, the file system is updated when an instruction to complete editing of one edit data item is received. Alternatively, the file system may be updated at one time when editing of a plurality of edit data items is completed. In this way, since the user can freely determine the update time of the file system, the user can advantageously perform destructive editing without taking into account when the file system is updated.

Still furthermore, the edit data is overwritten onto the base data in accordance with the data size of the deleted data block of the base data regardless of whether the data block is a fixed length data block or a variable length data block. Accordingly, the data size of the data blocks of the base data remains unchanged and, therefore, it is not necessary to update the file system in accordance with an overwritten data block of the edit data. In this way, the processing speed of destructive editing can be increased. In addition, since unnecessary processing is not performed, the power consumption can be reduced. Furthermore, destructive editing using variable length encoded compression data (e.g., MPEG data) can be performed in real time.

2. Modifications

While the foregoing embodiment has been described with reference to the optical disk 27 serving as the recording unit 4, a magnetic disk or a flash memory may be employed as the recording unit 4. Alternatively, a removable medium that is removably mounted in the video and audio recording apparatus 1 may be employed as the recording unit 4.

The series of processes of the above-described embodiment can be executed not only by hardware but also by software. When the above-described series of processes are executed by software, the programs of the software are installed in a computer incorporated into dedicated hardware. Alternatively, a variety of programs are installed in a computer. In this way, a variety of functions can be provided. For example, the programs that form the desired software can be installed in a general-purpose personal computer and can be executed.

Alternatively, a recording medium that stores the program code of software for realizing the functions of the above-described embodiments may be provided to a system or an apparatus. The functions are realized by a computer (or a control unit, such as a central processing unit (CPU)) of the system or apparatus that reads the program code recorded in the recording medium and executes the program code.

Examples of the recording medium used for providing the program code include a floppy disk, a hard disk, an optical disk, a magnetooptical disk, a CD-ROM (compact disk-read only memory), a CD-R (CD recordable), a magnetic tape, a nonvolatile memory card, and a ROM (read only memory).

In addition, the functions of the above-described embodiments can be realized by executing the program code read by a computer. The present invention further includes the case in which, for example, an operating system (OS) running on the computer performs part of or all of actual processing and, thus, the functions of the above-described embodiment can be realized.

The present application contains subject matter related to that disclosed in Japanese Priority Patent Application JP 2009-172386 filed in the Japan Patent Office on Jul. 23, 2009, the entire content of which is hereby incorporated by reference.

It should be noted that the present invention is not limited to the above-described embodiments, but various other configuration may be provided without departing from the scope of the invention.

What is claimed is:

1. A video and audio recording apparatus comprising:
a recording medium configured to record base data including first video data and/or first audio data therein on a predetermined unit-of-recording basis;
and a control unit configured to start destructive editing in response to an instruction to start editing received through an operation unit and stop the destructive editing in response to an instruction to stop editing received through the operation unit, the destructive editing representing editing in which the base data is deleted on the predetermined unit-of-recording basis and edit data including second video data and/or second audio data and formed on a variable length units-of-recording basis is overwritten onto the base data on the predetermined unit-of-recording basis,
the edit data being input from the base data read from the recording medium on the predetermined unit-of-recording basis in synchronization with a speed at which the first video data and/or first audio data are reproduced;
wherein when part of the base data is deleted, the control unit writes, using management information for managing a physical area of the base data in the recording medium on the predetermined unit-of-recording basis, information indicating that the physical area in which the deleted part of the base data was recorded is defined as a reserved area, which is an unrecorded area that is physically released by deleting the part of the base data and is considered an area into which edit data that includes video data and/or audio data formed on a variable length units-of-recording basis may be recorded, on the predetermined unit-of-recording basis to the management information, and wherein when the edit data is input in response to the instruction to start editing, the edit data is overwritten into the physical area defined as the reserved area where the base data is deleted on a preferential basis thereby overwriting said part of the base data on the predetermined unit-of-recording basis.

2. The video and audio recording apparatus according to claim 1, wherein the control unit writes, to the management information, information indicating that a predetermined number of the units of recording arranged from a point at which the destructive editing is instructed in the order in which the base data is reproduced are defined as the reserved area, and wherein as the reserved area is subjected to destructive editing, the reserved area is shifted in the order in which the base data is reproduced, and wherein when the instruction to stop the destructive editing is received, the definition of the reserved area is deleted from the management information.

3. The video and audio recording apparatus according to claim 1, further comprising:
a nonvolatile memory that holds information even when power supply is shut off;
wherein the control unit sets, in the nonvolatile memory, an editing flag indicating that the base data is being subjected to destructive editing, and wherein when the destructive editing is abnormally terminated and if the destructive editing is restarted, the control unit searches for the unit of recording having the first audio data included in the base data for which the destructive editing has not been completed using the editing flag set in the nonvolatile memory and writes, into second management information that defines the information regarding the base data for at least one unit of recording, a status indicating that data other than the first and second audio data has been recorded in the found unit of recording included in the base data.

4. An editing method for use in performing destructive editing on base data read from a recording medium on a predetermined unit-of-recording basis,
the destructive editing being started in response to an instruction to start editing received through an operation unit and being stopped in response to an instruction to stop editing received through the operation unit, the base data including first video data and/or first audio data,
the destructive editing representing editing in which the base data is deleted on the predetermined unit-of-recording basis and edit data including second video data and/or second audio data and formed on a variable length units-of-recording basis is overwritten onto the base data on the predetermined unit-of-recording basis, the edit data being input on the predetermined unit-of-recording basis from the base data in synchronization with a speed at which the first video data and/or first audio data are reproduced,
the method comprising the steps of when part of the base data is deleted, writing, using management information for managing a physical area of the base data in the recording medium on the predetermined unit-of-recording basis, information indicating that the physical area in which the deleted part of the base data was recorded is defined as a reserved area, which is an unrecorded area that is physically released by deleting the part of the base data and is considered an area into which edit data that included video data and/or audio data formed on a variable length units-of-recording basis may be recorded, on the predetermined unit-of-recording basis to the management information; and when the edit data is input in response to the instruction to start editing, overwriting the edit data into the physical area defined as a reserved area where the base data is deleted on a preferential basis thereby overwriting said part of the base data on the predetermined unit-of-recording basis.

* * * * *